Patented Dec. 15, 1931

1,836,858

UNITED STATES PATENT OFFICE

CORNELIUS MASSATSCH, OF BERLIN, AND EUGEN GUSTAV CLUSS, OF HEILBRONN-ON-THE-NECKAR, GERMANY, ASSIGNORS TO THE FIRM MATRO G. M. B. H., OF HEIL-BRONN-ON-THE-NECKAR, GERMANY

METHOD OF DRESSING THE GERMS OR THE COMPONENTS OF THE GERMS OBTAINED IN THE MALTING HOUSE FOR RENDERING THEM SUITED AS HUMAN FOOD AND FOR DIETETIC PURPOSES

No Drawing. Application filed December 27, 1927, Serial No. 242,974, and in Germany April 13, 1926.

This invention relates to the industrial and commercial utilization of the root germs of grain and maize obtained as subproducts and in large amounts from the malting process and from the manufacture of beer. These root germ products are, according to our invention, dressed and worked into products intended for use as human food or as dietetic means in order to promote health.

According to one or the other of said purposes to be considered, the root germs are treated in a different manner.

One object of our invention consists in the dressing of the dried-up germs obtained in malting, that is to say, of all germs assembled in the drying-kiln when malting.

Another object of our invention consists in the manufacture of flour-like products from malt germs. These flours are prominently suited as human food and can be used for the manufacture of a variety of baker's wares or may be added to the usual flours and mixed with them also for the just mentioned purpose.

It is, finally, an object of our invention to treat the root germs in a particular manner, especially as regards the root germs of the grains, for the purpose of obtaining extracts rich in vitamines which can be used directly as such or can be added to food poor in vitamines in order to improve them.

It is known that the root germs obtained in the malting house represent a product which is rich in nitrogen, ferments and vitamines, and is composed, according to an analysis, as follows:

|  | Per cent |
|---|---|
| Organic substance | 93,09 |
| Raw protein | 27,68 |
| Raw fat | 1,51 |
| Extract substances free from nitrogen | 49,77 |
| Raw fibre | 14,13 |
| Pentosans | 17,03 |
| Raw fibre free from pentosans | 11,77 |
| Extract substances free from pentosans and from nitrogen | 35,08 |
| Total amount of nitrogen | 4,43 |
| Albuminiferous nitrogen | 3,034 |

Of the total amount of nitrogen about 22% is contained in the root germs in a form in which the nitrogen is soluble in water, whereas 78% is in a form in which the nitrogen is insoluble in water. There results therefore from this the particular adaptability of the root germs in question for the purposes in view, but their disagreeable cucumber-like taste, and also their stale bitter taste with its after-taste, prevented hitherto the utilization of said germs as human food, as well as the utilization of their fermenting and supplementing action for therapeutic purposes. On the other hand, the excellent adaptability of the material as milk-fodder and as a nourishing substance in the manufacture of compressed yeast for obtaining a strongly fermentative compressed yeast is known.

As the root germs are obtained in large amounts in the brewing and malting industry it appears lucrative to determine a way by which they can also be rendered suitable for human consumption. In the course of investigations made for this purpose the surprising discovery was made that if root germ flour of the kinds in question is treated with small amounts of alkaline reacting compounds or lime to nearly completely neutral, that is to say, tasteless mixtures are obtained which, even if incorporated into other flours or mixtures of flours in such large amounts as 25% or more, are excellently endured and utilized even by and in a sick organism which is quite surprising but has been proved as a fact by digestion experiments carried out for several months. The comparatively high contents of raw fibre can be reduced sufficiently by repeated grinding and sifting.

The root germs obtained from the malting procedure show unequal conditions, and the fact has been revealed by experience that depriving the root germs of their bitter taste does not always proceed uniformly, especially if the root germs have come from the upper portion of the malting kiln. Besides, also the age of the germs is of importance for favorable results, and the treatment with alkali or lime must, therefore, be carried out differently as most suited in the individual cases. The alkali used is preferably caustic alkali or potash, but also other alkaline reacting compounds or lime can be used, the alkali etc. being added to the finely ground root germs either in a dry state or in a dissolved state, but in this latter case attention must be directed to the conditions that a certain degree of concentration, as well as a certain limit of the time of action, should not be surpassed, as will appear from the examples.

The root germs in question contain up to 50% of dissolvable extractive and albuminiferous substances which would be washed out completely and lost during the phase of depriving the germs from the bitter taste with the aid of an aqueous alkali solution or lime water if this is permitted to act too long. Such detrimental actions are prevented in that in every case where a liquid alkali solution is used the germs are moistened only to the extent that with a thin alkaline solution as is just necessary to obtain in the entire mass a degree of moisture of about from 35 to 40%, or so much of the solution is employed that the root germs are just covered with it, but in this case the duration of the action should last only a few minutes.

It has been found to be suited to the purpose, as regards certain kinds of germs, especially older germs, to deprive them from dust, ventilating them strongly, and then to lead a streaming steam jet through the thus preliminarily treated germs for a short time, whereafter the germs are dried and ground, and the flour is treated with a weak solution of an alkali or with lime water. This having been effected, the mass obtained is dried and again ground, but the dried mass is preferably also again strongly ventilated prior to the grinding.

With these procedures great care must be exercised to prevent surpassing temperatures of from 50 to 60° C.

Detailed experiments with animals have disclosed the surprising fact that under such working conditions also the contents of vitamines of the germs is maintained in active form and that the root germ flour obtained as the final product of the dressing procedure can fully display its growth and its antirachitic properties. In view of the sensitiveness of the vitamines, and of the difficulty to completely preserve them active in a technical product of a dressing, that result is surprising, as well as of great importance for the food-manufacturing industries.

If no particular value is placed upon the maintenance of the contents of vitamines in the root germs, either for the reason that only the pure nutritive substances are to be used, or for the reason that during the further treatment other substances containing vitamines are added to the germs, i. e. to the root germ flour, the excellent taste can in many cases be improved by slightly roasting the germs at a temperature above 100° C., the root germs being roasted either directly or after they have been moistened with water. Treating the germ flour with an alkali or an alkaline reacting compound or lime can, in the latter case, take place prior to, or after, the roasting phase, or may even be dispensed with, since the roasted material, owing to the presence of extract substances soluble in water (about 50%), assumes a taste which although somewhat bitter and like caramel can, however, be greatly improved by mixing the germ flour with another flour or with cocoa, sugar or the like. Changing the taste of the germ flour in this way is easier than changing it prior to the final treatment, and the somewhat tart or harsh taste obtained in the just stated manner is particularly liked by many.

If, in contradistinction to what has been stated in the beginning of the foregoing paragraph, particular value is placed upon maintaining the vitamines contained in the malt root germs, the process must be carried out in a somewhat different manner.

An examination of the root germs has disclosed the fact that they contain an active or effective sterine which is highly active or effective already when not exposed to rays and is contained in the root germs in an amount of about 0,15%. This fact proves the possibility of employing the root germs as a therapeutic means. In many cases also the use of the other root germ substances is not requisite, and obtaining the sterine directly by extraction is, even with the comparatively high contents of 0,15% as regards the dry substance, circumstantial, the circumstance being considered that in order to obtain about 1,5 kg. of active substance, without any remainder, about 1000 kg. of the raw material must be worked up.

Now, it has been determined that the desired result can be attained in a far simpler manner if the germs are preliminarily extracted in the usual manner with spirit, and the extract obtained is then inspissated in vacuo to a thick syrup. 100 kg. of root germs with a bulk of about 600 liters can be reduced in this way to 26 liters of extract, from which the active sterines can then be obtained by shaking the extract with ether.

*Example I.*—980 grams of flour from the roots of grain or maize containing germs which has passed through a 0,15 mm. sieve is mixed in small portions with 20 grams of burned and finely pulverized lime; the mixture is rendered thoroughly homogeneous in a ball-mill and then added, together with 1,5 kg. dextrinized grain flour, to 0,5 kg. malt flour. After this mixture has been roasted for a short time it can be used for a large variety of preparations.

*Example II.*—The same steps are carried out but with an addition of 20 grams of potash to the substances or flours to be mixed with each other.

*Example III.*—2 kg. flour of root germs are roasted for from ¾ to 1 hour at a temperature of from 115 to 120° C., and stirred repeatedly during that time; then 20 grams of potash or caustic alkali or lime is added and to this mixture is added the same amount of opened oat-flour and a little cocoa, whereupon the mixture now obtained constitutes a basis for therapeutical preparations, nourishing compounds and the like.

*Example IV.*—Raw root germs from the roasting hurdle of a drying kiln are deprived of the dust in a suitable machine, thereby purified, and then kneaded together with saturated lime-water for about ¼ of an hour, in such a manner that the degree of moisture of the germs amounts to from 35 to 40%. Then the germs are sifted, dried and ground. Thereby they are suited to the purpose to effect the several working procedures at a temperature not surpassing 50° C. The drying takes place within 4 hours.

*Example V.*—Raw root germs of the kind, and treated as stated in the Example IV are exposed for a short time to steam and then dried and ground. The dressing with lime-water now taking place is carried out in the same manner as in Example IV. Then the flour is again dried, sifted and ground again. If necessary the procedure may be repeated.

*Example VI.*—200 kg. of dry root germs of grain or maize are soaked with 1200 liters of a 0,5% potash solution having a temperature of 50° C., and the mixture is worked for 5 min. and is instantly thereafter pressed thoroughly in a fruit-press. The cake obtained is reduced to fibres at a temperature of from 50 to 60° C., dried while being repeatedly turned over and then ground. The output is 131 kg. of dry root germs which when being ground deliver from 66 to 70 kg. of fine flour which is able to pass through miller-gauze having meshes of 0,15 mm. width. The amount of liquid employed in this example corresponds just to the soaking capacity of the germ material worked.

*Example VII.*—The dressing is effected in the same manner as in the preceding example, but with the difference that in lieu of a potash solution saturated lime water is used which is produced, according to the requirement, from 1,5 or 4,5 or 9 kg. of pure burned caustic lime and 1200 liters of water, and is used for 200 kg. of germs. The length of time of the action and of the dressing is the same as in Example I.

The changes taking place, as a consequence of the manner of treatment, in the composition can be seen from the following table:

|  | Original germ flour. | The same after treatment with a 5% potash solution. | The same after treatment with saturated lime water. |
|---|---|---|---|
| Total amount of nitrogen | 4,86% | 4,73% | 4,35% |
| Nitrogen substances | 30,39 | 29,54 | 27,17 |
| Moisture | 8,19 | 9,96 | 8,23 |
| Ashes | 6,70 | 4,45 | 4,54 |
| Raw fibre | 8,0 | 8,89 | 10,24 |
| Soluble components | 38,10 | 18,36 | 19,75 |
| Thereof nitrogen | 2,49% | 1,14% | 1,16% |
| Nitrogen substances | 15,58 | 7,14 | 7,29 |
| Ashes | 6,00 | 3,08 | 2,98 |
| Residue | 16,00 | 8,14 | 9,48, | calculated from the content of nitrogen.

The influence upon the ashes and the dissoluble components is quite obvious; the filtrates obtained by the treatment with alkali are viscous and disagreeably smelling liquids which very easily pass over into fermentation and exhaling then a fetid smell. They contain an ample amount of tough, smeary, rubber-like components which can be precipitated by alcohol.

*Example VIII.*—700 grams of raw root germs are extracted thoroughly with spirit in a Soxhlet extraction apparatus, whereafter the spirit is driven off at a temperature of 50° C. and under a pressure of 40 mm. There have been obtained in this way 186,5 grams of a deep dark-brown extract composed as follows:

Substances soluble in ether, 0,59% of sterine, 3,24% of lecithine, 9,6% of fat.

Substances soluble in water, 32,0% of water, 54,64% of other substances soluble in water.

These latter substances contain ash components of the root germs, considerable nitrogen (about 7,5%) and chiefly saccchariferous substances.

The amount of those substances which are soluble in ether amounts only to 13,5% of the total amount and contains now the total amount of sterine. In order to separate this, ether is poured upon the extract, the mixture is stirred repeatedly, protected from air and light, and left standing. The sterine and the other fatty components pass over into the ether and may be obtained from this by slow evaporation in the usual manner; if not the other way is preferred to utilize the original highly active residue from the treatment with spirit or with ether for the vitaminization by means of food and as a specific therapeutic agent.

We claim:

1. The process of manufacturing a flour suited for human food from root germs of germinated grain, comprising moistening the dry germs resulting from the malting of grain, depriving said germs from the adhering dust, sifting them, moistening them with an alkali solution only in such a measure as is sufficient to wet them thoroughly, then drying the said germs at a low temperature, sifting them and grinding them.

2. The process of manufacturing a flour suited for human food from root germs of germinated grain, comprising depriving said germs from the adhering dust, sifting them, exposing them to steam, treating them for a short time with small amounts of an alkaline reacting compound at a temperature not exceeding 50° C., drying them and sifting and grinding them.

3. The process of producing a flour suited for human food and for dietetic purposes from root germs of germinated grain, comprising treating the root germs preliminarily at a mild heat for a short time with an amount of a thin alkali solution greater than the amount corresponding to the soaking capacity of the germs and uneffecting any substantial extraction of the solubles in the rootlets, separating the germs from the liquid, drying and grinding them so as to reduce them to a powder or flour and mixing this flour with another flour or other additions.

4. The process of manufacturing a flour suited for human food from root germs of germinated grain comprising depriving said root germs from the adhering dust, sifting them, exposing them to steam, treating them for a short time with small amounts of lime-water, drying them and sifting and grinding them.

5. The process of manufacturing a flour suited for human food from root-germs of germinated grain which comprises treating the root-germs preliminarily at a mild heat with an amount of diluted alkali solution corresponding to the soaking capacity of the root-germs and uneffecting any substantial extraction of valuable solubles from the rootlets, and drying and grinding the latter so as to turn them into a flour.

In testimony whereof we affix our signatures.

CORNELIUS MASSATSCH.
EUGEN GUSTAV CLUSS.